United States Patent
Tucker et al.

(10) Patent No.: US 11,942,622 B2
(45) Date of Patent: Mar. 26, 2024

(54) METHODS OF FABRICATING POROUS CERAMIC ELECTRODES FOR SOLID STATE BATTERY APPLICATIONS

(71) Applicant: THE REGENTS OF THE UNIVERSITY OF CALIFORNIA, Oakland, CA (US)

(72) Inventors: Michael Tucker, Piedmont, CA (US); Fengyu Shen, San Leandro, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 171 days.

(21) Appl. No.: 17/478,509

(22) Filed: Sep. 17, 2021

(65) Prior Publication Data

US 2022/0093904 A1 Mar. 24, 2022

Related U.S. Application Data

(60) Provisional application No. 63/080,169, filed on Sep. 18, 2020.

(51) Int. Cl.
| | |
|---|---|
| H01M 4/131 | (2010.01) |
| H01M 4/66 | (2006.01) |
| H01M 4/80 | (2006.01) |
| H01M 10/058 | (2010.01) |

(52) U.S. Cl.
CPC .......... H01M 4/131 (2013.01); H01M 4/664 (2013.01); H01M 4/801 (2013.01); H01M 10/058 (2013.01)

(58) Field of Classification Search
CPC ...... H01M 4/131; H01M 4/505; H01M 4/525; H01M 4/664; H01M 4/801; H01M 10/052; H01M 10/058
See application file for complete search history.

(56) References Cited

U.S. PATENT DOCUMENTS

2020/0153037 A1* 5/2020 Renna .................. B01J 6/008

FOREIGN PATENT DOCUMENTS

CN 105742761 A * 7/2016

OTHER PUBLICATIONS

Pan, Xiaowei, et al. "A flexible composite electrolyte membrane with ultrahigh LLZTO garnet content for quasi solid state Li-air batteries." Solid State Ionics 351 (2020): 115340.*

Jiang, Zhouyang, et al. "Perovskite membranes with vertically aligned microchannels for all-solid-state lithium batteries." Advanced Energy Materials 8.27 (2018): 1801433.*

(Continued)

*Primary Examiner* — Matthew T Martin
*Assistant Examiner* — Ankith R Sripathi
(74) *Attorney, Agent, or Firm* — O'BANION & RITCHEY LLP; John P. O'Banion

(57) ABSTRACT

Compositions and methods for the fabrication of electrode and porous lithium-garnet electrolyte scaffolds for use in solid state batteries and other devices are provided. The methods produce porous structures using phase inversion or high shear compaction processes to fabricate a solid-state battery electrode material from LLZO electrolytes. Engineered electrode structures with a porous scaffold of solid electrolyte material provide lower interfacial resistances and a mechanical support for a thin solid electrode layer improving performance.

4 Claims, 4 Drawing Sheets

(56) References Cited

OTHER PUBLICATIONS

Yuan, Rong-hua, et al. "Preparation and characterization of supported planar $Zr_{0.84}Y_{0.16}O_{1.92}$-$La_{0.8}Sr_{0.2}Cr_{0.5}Fe_{0.5}O_{3-\delta}$ composite membrane." Journal of Membrane Science 499 (2016): 335-342.*
CN-105742761-A Machine Translation.*
Shen et al., "Preparing Li-garnet electrodes with engineered structures by phase inversion and high shear compaction processes," Journal of the American Chemical Society, vol. 105, vol. 105, No. 1, pp. 90-98, (Jul. 11, 2021).
Liu et al., "Steam electrolysis in a solid oxide electrolysis cell fabricated by the phase-inversion tape casting method," Electrochemistry Communications, vol. 61, pp. 106-109, (Dec. 2015).
Lin et al., "Optimization of anode structure for intermediate temperature solid oxide fuel cell via phase-inversion cotape casting," Journal of the American Ceramic Society, vol. 100, No. 8, pp. 3794-3800, (Mar. 22, 2017).
Guillen et al., "Preparation and Characterization of Membranes Formed by Nonsolvent Induced Phase Separation: A Review," Industrial and Engineering Chemistry Research, vol. 50, pp. 3798-3817, (Mar. 8, 2011).
Jiang et al., "Perovskite Membranes with Vertically Aligned Microchannels for All-Solid-State Lithium Batteries," Advanced Energy Materials, vol. 8, No. 27, pp. 1801433 (1 of 7), (Aug. 13, 2018).
Yoon et al., "Cost-Effective Single Step Cofiring Process for Manufacturing Solid Oxide Fuel Cells Using HSC™ Anode," Journal of Fuel Cell Science and echnology, vol. 7, No. 2, pp. 021010-1 thru 021010-5, (Jan. 11, 2010).
Dassios et al., "Novel highly scalable carbon nanotube-strengthened ceramics by high shear compaction and spark plasma sintering," Journal of the European Ceramic Society, vol. 35, No. 9, pp. 2599-2606, (Sep. 2015).

\* cited by examiner

METHODS OF FABRICATING POROUS CERAMIC ELECTRODES FOR SOLID STATE BATTERY APPLICATIONS

CROSS-REFERENCE TO RELATED APPLICATIONS

This application claims priority to, and the benefit of, U.S. provisional patent application Ser. No. 63/080,169 filed on Sep. 18, 2020, incorporated herein by reference in its entirety.

STATEMENT REGARDING FEDERALLY SPONSORED RESEARCH OR DEVELOPMENT

This invention was made with government support under Contract No. DE-AC02-05CH11231, awarded by the U.S. Department of Energy. The Government has certain rights in the invention.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to solid state electrodes and fabrication methods and more particularly to lithium-garnet electrode structures and production methods with phase inversion and high shear compaction processes. The porous and dense bilayer architectures of the electrodes lower interfacial resistance and provide a mechanical support for a thin solid electrolyte layer.

2. Background

High energy density electrochemical cells, such as lithium-ion batteries have become essential as power sources for electric vehicles, power storage and a variety of consumer electronics such as personal computers, cellular telephones and video cameras. Conventional lithium-ion batteries generally include a positive electrode, a negative electrode, an electrolyte material and a separator disposed between the two electrodes. The electrolyte operates to reversibly conduct lithium ions back and forth between the negative electrode and the positive electrode and it can be in liquid or solid form.

Liquid electrolytes are typically lithium salts that are dissolved in a non-aqueous organic liquid solvent. However, liquid electrolytes with organic solvents are combustible at high temperatures, prone to leakage, have been known to outgas at high voltages and may be incompatible with electrodes made from lithium metal.

Solid-state batteries (SSBs), as the next-generation of battery technology, have gained extensive attention in recent years due to their high safety and potential compatibility with lithium metal anode. Solid state batteries have replaced the liquid electrolytes with a solid electrolyte that are not combustible to avoid these issues. However, rechargeable solid-state batteries have shown inconsistent or low battery performance due to increased contact resistance and internal resistance from air gaps and poor contact characteristics between electrolyte and electrodes. Poor contact characteristics may reduce ion conductivity and ion mobility reducing the capacity and performance of the batteries.

Garnet electrolytes show ionic conductivity greater than 1 mS cm$^{-1}$ at room temperature, which is sufficiently high to support reasonable current densities in lithium metal battery configurations. Ceramic electrolytes, however, exhibit poor interfacial contact with electrodes and they are generally thick and brittle leading to high ohmic impedance and mechanical failure. The specific energy density is also still low due to the high density of ceramics. In addition, it is challenging to fabricate garnet electrolytes, such as Al-doped $Li_7La_3Zr_2O_{12}$ (LLZO), with thickness <100 μm without any support, which means the lithium-ion conduction pathway between the electrodes is long.

Using a porous ceramic scaffold to support a thin ceramic electrolyte is a mature technique and has been widely applied in solid oxide fuel cells (SOFCs), filters, and SSBs. To fabricate porous scaffold for SSBs, tape casting, freeze tape casting, templating, electrospinning, 3D printing, etc., have been demonstrated. Most of these methods create porous structures with high tortuosity, leading to long lithium-ion diffusion pathways and challenges for infiltrating solid active material particles, and these methods may not scale well due to low throughput, complicated processing, or high cost.

The phase inversion (PI) process has been widely used in numerous chemical industries, biotechnology, environmental separation, and energy conversion and can fabricate large area porous scaffolds with low cost. It has also been used to construct micro-channels of $Li_{0.34}La_{0.51}TiO_3$ for SSBs. The PI process creates finger-like pores when the solvent in a slurry of ceramic particles, binder, and dispersant counter-diffuses with a non-solvent liquid placed in contact with the slurry surface. During the PI procedure, water is typically used as the non-solvent to induce phase separation. Water reacts with most battery materials, however, which is one reason why the PI process has not been widely applied in the battery community.

Accordingly, there remains a need for the development of an all-solid-state lithium-ion rechargeable battery that has improved interface contact characteristics and ion conductivity as well as excellent battery performance, while retaining the benefits of safety and durability over liquid electrolyte batteries.

BRIEF SUMMARY

Compositions and methods are provided for the fabrication of electrode and porous electrolyte scaffolds for use in solid state batteries and other devices. The methods produce porous structures using phase inversion or high shear compaction processes to fabricate a solid-state battery electrode material from $Li_{6.25}Al_{0.25}La_3Zr_2O_{12}$ (LLZO), for example. Phase inversion and high shear compaction are more scalable than other methods known in the art.

In the case of a structure produced by phase inversion, the resulting structure has anisotropic pores vertically aligned with the thickness of the layer, which facilitates the deposition of a powder battery material into the pores. In some embodiments, the phase inversion process temperature is optimized to control the number and size of the pores. In addition, the unique architecture of phase inversion tapes makes it possible to prepare an integrated electrolyte without merging a separate dense layer, as the finger-like pores that are produced do not penetrate the whole layer.

In some embodiments, the top of the phase inversion layer is removed before sintering. This removes the outer surface, which has lower porosity, and exposes the larger pores underneath. This aids in subsequent filling of the pores with another powder (e.g., such as battery active materials). The removal of the top of the phase inversion layer can be performed by the application of sticking tape (e.g., transparent tape or masking tape) or another sticky surface to the top surface of the LLZO layer and then peeling it off, for example. The surface may also be ground or polished to open the pores. In one embodiment, a sacrificial layer is applied to a surface of the LLZO tape or layer that is subsequently removed to increase pore size.

When fabricating a structure using high shear compaction, aqueous processing is used during the mixing step, even though LLZO reacts with water. The LLZO reaction products are recombined during the subsequent sintering step in the process. A specific range of LLZO ratios are used so that pores are formed.

Bi-layer and tri-layer structures with dense electrolyte and porous scaffold layers can be prepared and functionalized into electrodes. The porous/dense bi-layer laminated structures provide a thin densified electrolyte supported on a highly porous scaffold. Powdered cathode material, for example, can be introduced into the porosity of the scaffold with vacuum infiltration providing excellent physical contact between cathode material and the scaffold.

According to one aspect of the technology, an electrode fabrication process is provided that is industrially scalable, predictable and has low operating costs.

Another aspect of the technology is an electrode fabrication method that produces a thin densified electrolyte supported on a highly porous scaffold.

A further aspect of the technology is to provide reliable methods that provide control over porosity and pore orientation of LLZO scaffolds and laminates.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, systems and methods for the fabrication of lithium-garnet scaffold electrodes with engineered porosity filled with a cathode material are generally shown. Several embodiments of the technology are described generally in FIG. 1 to FIG. 5 to illustrate the characteristics and functionality of the devices, systems and fabrication methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Architectures based on a $Li_{6.25}Al_{0.25}La_3Zr_2O_{12}$ (LLZO) Li-garnet material and a typical cathode material $LiNi_{0.33}Mn_{0.33}Co_{0.33}O_2$ (NMC) are used to generally illustrate the methods and resulting electrode characteristics. In this illustration, LLZO scaffold electrodes with engineered structures may be fabricated by phase inversion (PI) and high shear compaction (HSC) processes and incorporated into bi-layer architectures.

Figure 1:
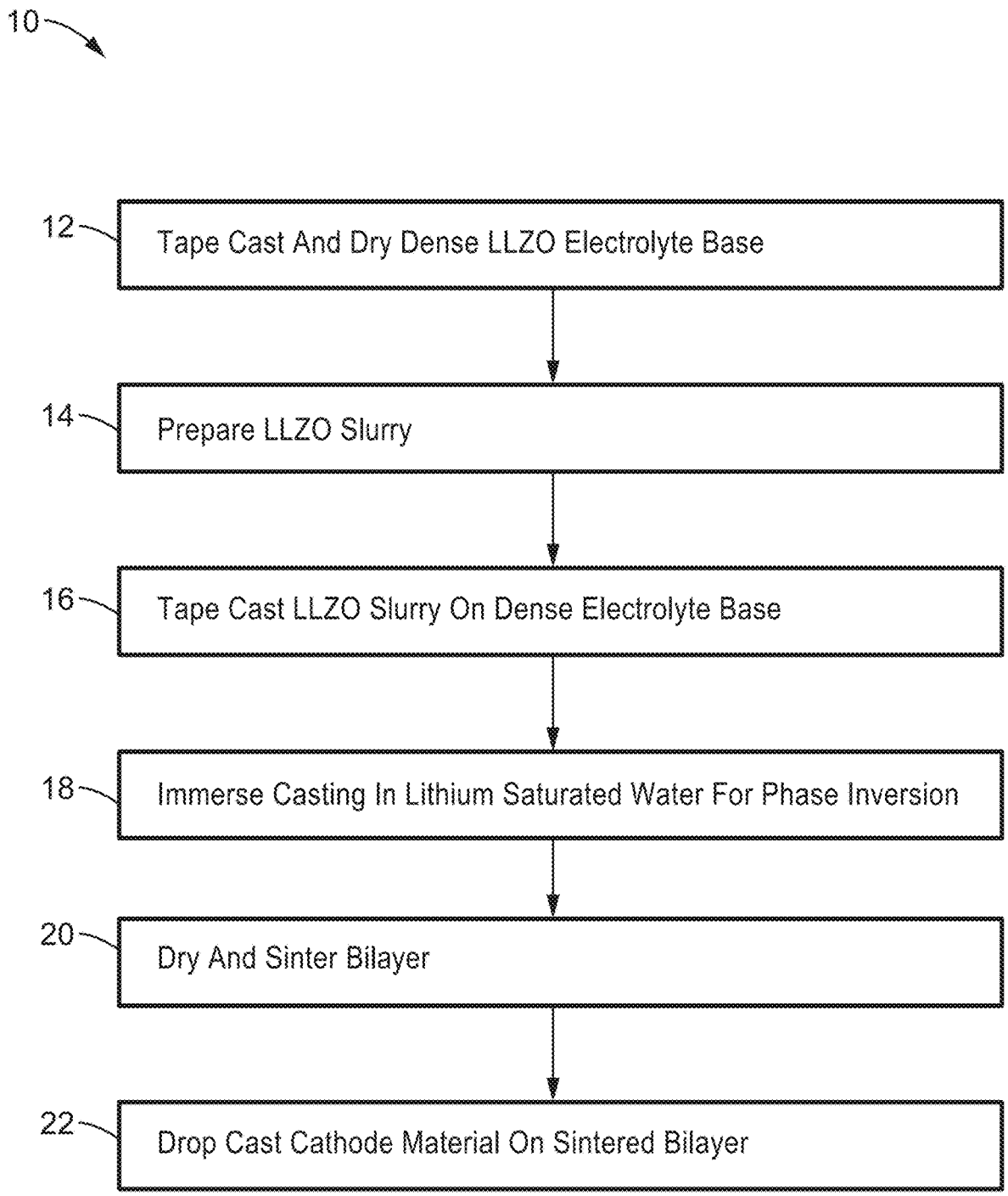
FIG. 1 is a functional block diagram of a method for fabricating porous Li-garnet electrodes with a phase inversion process according to one embodiment of the technology.

Turning now to FIG. 1, an embodiment of the method 10 for the fabrication of engineered cathodes using a phase inversion process is shown schematically. At the step of block 12, a dense LLZO electrolyte base layer is tape cast from doped LLZO and a solvent based binder in a solvent and dispersant. Prior to casting, the suspended mixture is preferably ball milled to reduce particle size and blend the components to a homogeneous suspension. The suspension may be tape cast on to a silicon-coated polymer sheet or similar substrate and allowed to dry.

In another embodiment, the base layer is optional. The phase inversion structure naturally has a dense layer on one surface of the cast tape. The dense base layer can be added at block 12 to make the total dense layer thicker, or to cover over defects that may occur in the phase inversion structure.

A LLZO slurry is then prepared at block 14. The LLZO slurry is formed from LLZO powder, a solvent, a dispersant, an optional lithium salt and a binder. In one preferred embodiment, the lithium salt comprises $Li_2CO_3$, the dispersant comprises polyvinylpyrrolidone (PVP) and the binder comprises polyethersulfone (PESF). Optionally, MgO may also be added to the LLZO slurry or the LLZO dense base slurry or both. MgO acts as a sintering aid and limits the LLZO grain growth. In another embodiment, the LLZO slurry may also include a wetting agent.

The prepared LLZO slurry is tape cast on the dense base layer at block 16 of FIG. 1. In one embodiment, the milled slurry can be mixed and degassed in a vacuum chamber to remove any bubbles in the slurry before it is tape cast on the base layer.

The bi-layer structure that was prepared at block 16 by casting the LLZO slurry onto a dry pre-formed electrolyte base is followed by phase inversion at block 18. At block 18, the tape cast bilayer is immersed in a bath of lithium saturated water for phase inversion. A solvent exchange takes place in the bath. Although water can be used for solvent exchange, a $Li_2CO_3$-saturated water bath is preferred because it effectively inhibits $Li^+$ loss during the phase inversion solvent exchange. Although $Li_2CO_3$ saturation is preferred, LiCl, LiOH, $LiNO_3$, or $Li_2SO_4$ saturated water can also be used.

Finger-like vertically aligned pores are formed in the cast LLZO tape as a result of the solvent exchange. In one embodiment, the phase inversion process is temperature optimized. The saturated water bath preferably has a temperature of between about 0° C. and about 50° C. to control porosity since the observed porosity of the LLZO tape increases with decreasing temperatures. For example, porosity of the PI tapes can be increased by approximately 37% by lowering the water bath temperature to about 0° C.

After a sufficient period of time for solvent exchange and phase inversion, the bi-layer structure is transferred out of the bath and allowed to dry in preparation for sintering at block 20. Sintering removes the binders and imparts strength and integrity to the porous tape.

Lamination or hot pressing are not needed to achieve good bonding between the porous and dense layers of the structure. The PI porous/dense bilayer structure can be prepared without lamination or the use of a hot press so that the vertical pores are preserved without damage.

In some embodiments, the top of the phase inversion layer is removed before sintering. This removes the outer surface, which has lower porosity, and exposes the larger pores underneath. This aids in the subsequent filling of the pores with another powder (e.g., such as battery active materials). The removal of the top of the phase inversion layer can also be performed by sticking tape (e.g., transparent tape or masking tape) or another sticky surface to the top surface of the LLZO layer and then peeling it off.

In another embodiment, the binders are removed from the structure by heating the tapes to a temperature from about 400° C. to about 700° C. and holding the tape at that temperature range for about 1 hour in an air atmosphere before sintering at between about 1000° C. to about 1125° C. for about 5 hours in an argon atmosphere after removing the binder.

Finally, at block 22, cathode material in the form of particles suspended in a volatile solvent can be infiltrated into the pores under vacuum, for example.

In one embodiment, the cathode material is preferably a lithium nickel manganese cobalt oxide (NMC) and the solvent comprises n-methyl-2-pyrrolidone (NMP). This process provides good contact between the cathode material and the LLZO structure.

Accordingly, large area porous tapes with vertically aligned finger-like pores can be fabricated by the PI process, and the intended cubic phase is obtained after sintering when using a water bath that is saturated with a lithium salt such as $Li_2CO_3$, for example.

Figure 2:
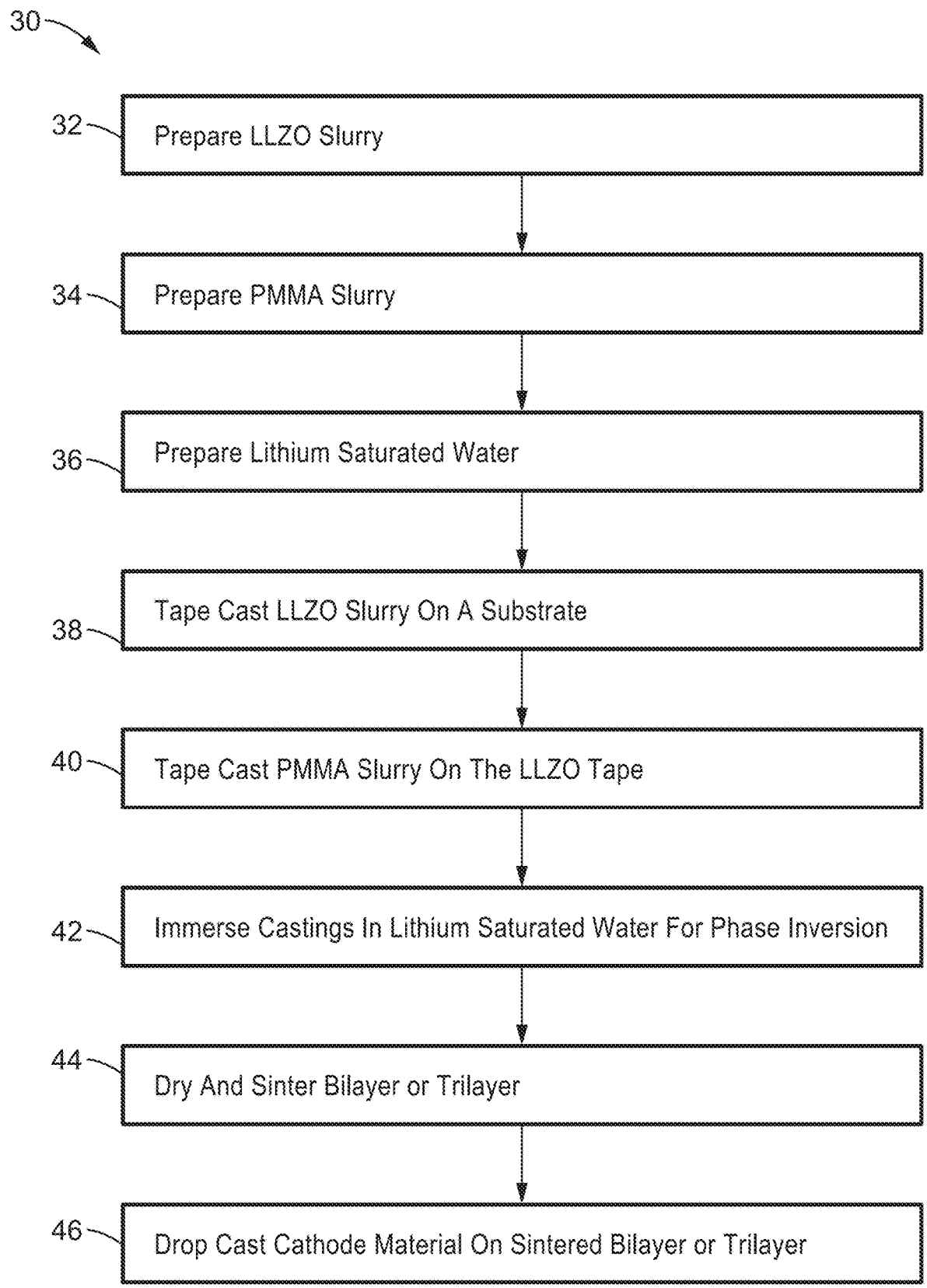
FIG. 2 is a functional block diagram of a method for fabricating porous Li-garnet electrodes with a phase inversion process and a sacrificial layer according to an alternative embodiment of the technology.

An alternative fabrication process 30 using phase inversion is shown in FIG. 2, where the dense base layer is an optional feature. In this embodiment, a LLZO slurry is prepared at block 32. The LLZO slurry is preferably composed of LLZO powder, $Li_2CO_3$, MgO, a PVP dispersant, a n-methyl-2-pyrrolidone (NMP) solvent, and a polyethersulfone binder. In one preferred embodiment, 5 g LLZO, 0.3 g $Li_2CO_3$, 0.15 g MgO, 0.05 g dispersant and 6.75 g solvent are ball milled overnight. Then 0.483 g of a binder is added to the mixture and ball milled for 2 hours. An optional wetting additive DYNOL604™ is added and milled for about 30 more minutes to provide the final LLZO slurry at block 32.

At block 34, a slurry of sacrificial material is also prepared. The sacrificial material will burn or evaporate during subsequent debinding or sintering steps. Poly(methyl methacrylate) (PMMA) is preferred as the sacrificial material, but many other materials are envisioned including carbon, graphite, polymers, and volatile materials such as camphor or naphthalene. The PMMA slurry is preferably prepared from PMMA, a dispersant, a solvent, and a binder. The processing and dispersant, solvent, and binder are preferably the same as used in the preparation of the LLZO slurry at block 32.

The lithium saturated water for the solvent exchange water bath is prepared at block 36. The preferred lithium salt for the water bath is $Li_2CO_3$. However, other lithium salts like LiCl, LiOH, $LiNO_3$, or $Li_2SO_4$ can be used. In one illustration, 13 g of $Li_2CO_3$ is dissolved in 1 L of deionized water with magnetic stirring. Then 500 mL of $Li_2CO_3$ saturated water is poured into a stainless-steel tray surrounded by ice. The saturated bath water temperature is preferably cooled down to about 0° C.

With the slurries and saturated water prepared, the LLZO slurry is then tape cast on to a substrate at block 38. In one embodiment, the substrate is a Si-coated Mylar substrate or an uncoated polyethylene terephthalate (PET) substrate. In a further embodiment, the substrate is a dense tape LLZO substrate.

The prepared PMMA slurry is then tape cast on top of the LLZO tape at block 40. In one preferred embodiment, the LLZO layer has a thickness of about 320 μm and the PMMA has a thickness of about 400 μm. Warping of the PET substrate may be prevented during phase inversion by adhering the substrate on to an $Al_2O_3$ plate with a sticky tape.

At block 42 of FIG. 2 the cast bilayer and substrate are immersed into the cold lithium saturated water bath for phase inversion. It may be necessary to wait for a period of time before transferring the tape to the bath to allow bubbles that have appeared in the tape to dissipate.

After solvent exchange/phase inversion is completed, the tape bi-layer is removed from the water bath and dried overnight in ambient air at block 44. The tape composite may be separated from the substrate and cut or shaped to the desired size. The tape composite is then heated to the vaporization temperature of the binding agent to debind the tape composite. The temperature is then raised to a sintering temperature to sinter the composite. For example, the tape composite may be placed between two $Al_2O_3$ plates and placed in a box furnace at 650° C. for 2 hours to debind. The heating rate is typically about 1° C./min and the cooling rate is about 5° C./min.

For sintering, the composite tape may be placed between two graphite sheets bounded by two $Al_2O_3$ plates (0.05" thick) on the outside. The tape is preferably sintered at about 1120° C. to 1150° C. for 2 hours in an Argon atmosphere, with heating and cooling rates of about 5° C./min.

The final sintered structure at block 44 can be further functionalized by drop casting a cathode material at block 46. For example, an NMC suspension can be drop cast on bi-layer structures and infiltrated under vacuum and then dried under vacuum at 60° C. for 5 hours to evaporate the NMP solvent.

In another alternative embodiment, a porous tri-layer composite is fabricated that has a dense LLZO tape base, a LLZO porous tape layer and a PMMA tape layer. As described above, a base of a dense LLZO layer with a binder is prepared and allowed to dry. Then a LLZO slurry is tape cast on the base and the PMMA slurry is thereafter tape cast on the LLZO tape. The tri-layer structure is then transferred to a 0° $Li_2CO_3$ saturated water bath for phase inversion. Solvent exchange typically takes about 60 minutes. The structure is removed from the bath and dried, cut to size and then the same de-binding and sintering procedures are applied to the tri-layer structure as described above.

Figure 3:
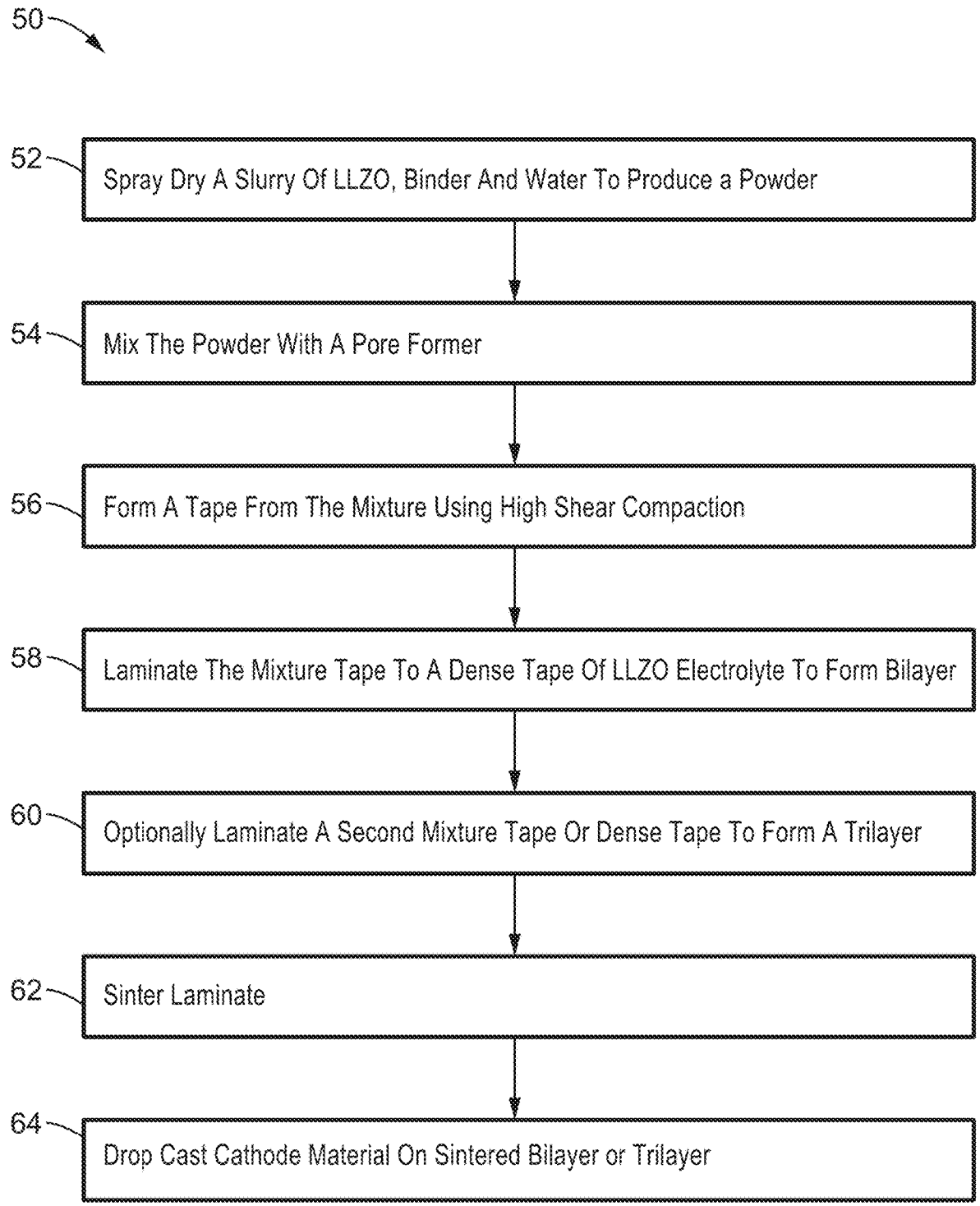
FIG. 3 is a functional block diagram of a method for fabricating porous Li-garnet electrodes with a high shear compaction process according to another embodiment of the technology.

Referring now to FIG. 3, a method 50 for preparing dense/porous bi-layer structures with high shear compaction tapes is shown schematically. In the embodiment shown, a LLZO slurry is prepared from LLZO powder, a binder and a water solvent that is spray dried in a spray drier to produce a fine powder of similarly sized particles at block 52.

The LLZO particles produced at block 52 are mixed with a pore former at a set vol % at block 54. For example, LLZO slurry for tape formation by high shear compaction can be prepared with LLZO, $Li_2CO_3$, MgO, a commercial binder, and a pore former, preferably in the range of about 35 vol % to about 85 vol % (for example 40, 60, 80 vol %).

At block 56, LLZO tapes are formed from the mixture produced at block 54 with a high shear compaction process. The high shear compaction process (HSC™) is well known in the art and described in, for example, U.S. Pat. No. 5,766,394.

The HSC tapes may be laminated to a dense LLZO tape to form a bi-layered structure at block 58. The HSC and dense LLZO tapes can be cut to a desired size before or after lamination at block 58.

Optionally, at block 60, a second mixture LLZO tape or dense LLZO tape can be laminated to the bi-layer structure that was constructed at block 58 to form a tri-layered structure. The extra layer is not typically laminated to a layer of the same type. Accordingly, tri-layer structure can have configurations such as dense-porous-dense or porous-dense-porous laminates.

For example, the lamination of the dense/porous bi-layer structure or the porous/dense/porous tri-layer structure may be accomplished at 100° C. with a pressure 100 MPa (120 MPa for the HSC tape with 80 vol % PMMA). Normally, Si-coated PET films can be used to sandwich the multi-layer structure during lamination. The tape may be heated without pressure initially and then pressure applied after 10 min. The pressure usually lasts for ~20 min and the tape can be taken out immediately.

Removal of the binder and sintering of the bi-layer or tri-layer laminated structures takes place at block 62 by heating. Binder removal creates a porous structure that is sintered thereafter. Typically, the laminated tape structures are placed between two $Al_2O_3$ plates and placed in a box furnace at 700° C. for 1 hour to volatilize the PMMA binder. The heat rate is 1° C./min and the cooling rate is 5° C./min. The temperatures and times for de-binding may depend on the binder that is selected and may be different from what is described if different binders are selected.

When fabricating a structure using high shear compaction, aqueous processing is used during the mixing step, even though LLZO reacts with water. However, the LLZO reaction products are recombined during the subsequent sintering step at block 62. A specific range of LLZO to binder and pore former ratios are used so that pores are formed. During sintering, the optional MgO acts as a sintering aid and is not doped into the LLZO unit cell.

Construction of a cathode in this illustration may be performed by functionalizing the LLZO scaffolds with the infiltration of a cathode material in a solvent in the pores of the scaffold by vacuum infiltration at block 64.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the functionality of the materials and methods, porous/dense bi-layer architectures based on a $Li_{6.25}Al_{0.25}La_3Zr_2O_{12}$ (LLZO) Li-garnet material were fabricated and tested. The dense layer of the bi-layered structure was prepared by tape casting a commercial Al-doped LLZO powder (Ampcera, USA) with a solvent-based binder (Polymer Innovation Inc., USA). Specifically, LLZO powder (5 g), $Li_2CO_3$ (0.3 g) and MgO (0.1 g) were mixed in a Teflon bottle with 30 g $ZrO_2$ balls. MgO acted as a sintering aid and limits the LLZO grain growth. Toluene solvent (4.5 g) and DS002 dispersant (0.1 g, Polymer Innovations, Inc., USA) were added subsequently. The mixture was ball milled overnight. MSB1-13 binder (2 g, Polymer Innovations, Inc., USA) was then added and the suspension was ball milled for another 4 h. After tape casting onto Si-coated Mylar substrates, the tapes were dried naturally and peeled off of the substrate.

The porous layer of the bi-layer structure was prepared with a phase inversion process. The LLZO slurry for tape casting the porous layer was made with LLZO powder (5 g), $Li_2CO_3$ (0.3 g) and MgO (0.1 g) that were mixed in a Teflon bottle with 30 g $ZrO_2$ balls. Then a N-Methyl-2-pyrrolidone solvent (NMP, 4.5 g) and polyvinylpyrrolidone dispersant (PVP, 0.05 g) were added. After ball milling for 4 hours, a polyethersulfone (PESF, 0.322 g) binder was added into the suspension, followed by 2 hours of ball milling. Thereafter, PL008 (0.1 g, Polymer Innovation Inc., USA) was added to improve wetting on the Mylar casting substrate, followed by 30 minutes of ball milling.

The prepared LLZO suspension was then tape cast on a Si-coated Mylar substrate and soaked immediately in a water bath with either de-ionized (DI) water or $Li_2CO_3$-saturated water. After the solvent exchange was completed, the tape was removed from the water bath and dried overnight in ambient air.

In addition, bi-layer structures were prepared by casting the LLZO slurry onto a dry pre-formed dense electrolyte tape, followed by phase inversion. Lamination or hot pressing were not needed to achieve good bonding between the porous and dense layers.

During the phase inversion process, solvent exchange was initially carried out at about 0° C. for 30 min, with DI water as the non-solvent. Rapid exchange of water and NMP occurred between the interface, causing the precipitation of PESF along with the LLZO powder because of its limited solubility in water. During this process, $Li^+/H^+$-exchange caused severe de-lithiation of the LLZO slurry in the water bath. After sintering at 1125° C. for 5 hours, only the Li-deficient $La_2Zr_2O_7$ phase was detected by XRD (Figure S1). Severe Li loss was observed even if an extra $Li^+$ source ($Li_2CO_3$) was added into the LLZO slurry. To overcome this issue, the DI water was replaced with $Li_2CO_3$ saturated water and this effectively prevented the $Li^+/H^+$-exchange. Also, the Lithium salt in the residual water is retained in the LLZO tape after drying, and could compensate for subsequent lithium loss during sintering. The ICP-OES data are shown in Table 1.

The normalized stoichiometry of Li:Al:La:Zr by La-content was determined to be 7.08:0.24:3:2.17. As a reference, the stoichiometry of the LLZO green powder is 6.52:0.21:3:2.20. The lithium was rich because an extra Li source was added to the phase inversion slurry mixture as well as saturating the water bath.

The dry composite tapes were cut into the desired shape and size and debinded at 700° C. for 1 hour in air with heating rate of 1° C./min. They were sandwiched between two thin $Al_2O_3$ sheets to prevent warping during debinding. The debinded tapes were then sintered at 1125° C. for 5 hours in an Argon atmosphere with a heating and cooling rate of 5° C./min. Graphite sheets were inserted between the tapes and $Al_2O_3$ sheets to prevent reaction during the sintering process.

During sintering, the MgO acted as a sintering aid and was not doped into the LLZO unit cell. The XRD pattern of the sintered tape showed a cubic LLZO phase with two tiny peaks at 25.9 degrees and 27.8 degrees. The lattice parameter was calculated to be 12.991 Å, which is a little higher than found in the dense tapes. The expand lattice parameter could be attributed to the extra Li in the tape.

Figure 4:
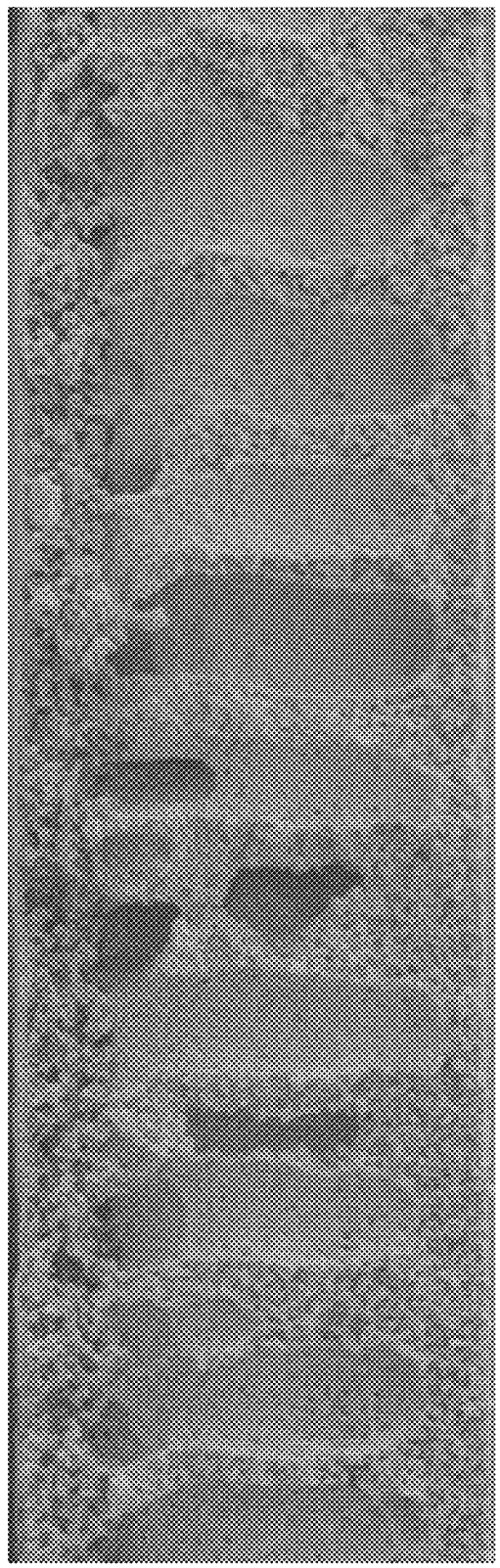
FIG. 4 a cross-sectional SEM image of a bi-layer structure prepared with a PMMA layer on top of the LLZO layer. The PMMA layer can be burned out to leave open finger-shape pores in the LLZO tape. Pore size on the top may be expanded from several microns (without the PMMA layer) to approximately 50 µm (with the PMMA layer).

Microtomography was used to characterize the pore shape and distribution. Phase inversion introduces vertical and finger-like pores into the structure as illustrated in FIG. 4.

The depth of the pores was approximately 120 µm and the pores do not completely penetrate to the bottom of the tape. The pores at the top surface were small, 3 µm to 7 µm, without the sacrificial layer, and the grain size on the electrolyte surface was roughly 5 µm to 10 µm. There was also a dense layer with a thickness of between 20 µm to 30 µm observed at the bottom of the structure.

Vertical pore shape was confirmed throughout the imaging volume. The average porosity of the sintered tape prepared at 0° C. was about 37% and the porosity changes along the thickness (Z coordinate). It is about 30% at the top surface and increases in the bulk, then suddenly decreases to zero at the dense bottom layer. The average pore area has a similar distribution. An evaluation of the average pore shape derived from the calculated pore area curve indicates that the pore is largest in the middle, necks gradually at the top, and pinches off suddenly at the bottom.

The porosity and pore size can be adjusted and optimized by changing the water bath temperature. Higher bath temperatures increase the solvent exchange kinetics and limits the growth of pores. As the temperature rises from 0° C. to 50° C., the porosity and pore size decrease gradually, as verified by tomography xyz slices and average porosity data. The porosity ranges from 10% to 37% when phase inversion is carried out at 50° C. and 0° C., respectively.

The bi-layer structures that were fabricated by casting the PI layer on top of a pre-formed tape cast electrolyte layer were co-sintered successfully, with excellent adhesion between the layers and full densification of the electrolyte layer. While it is interesting to demonstrate the fabrication of a bi-layer structure with this approach, the additional electrolyte layer appears to be unnecessary or optional, as the bottom layer of the PI structure is already dense.

Example 2

The fabrication of a phase inversion tape with sacrificial polymer layer was also demonstrated. A cross-sectional SEM image of a bi-layer structure prepared with a PMMA layer on top of the LLZO layer is shown in FIG. 4. The PMMA layer can be burned out to leave open finger-shape pores in the LLZO tape. Pore size on the top may be expanded from several microns to approximately 50 µm by addition of the sacrificial layer.

In this illustration, a LLZO slurry was prepared of LLZO powder (5 g), $Li_2CO_3$ (0.3 g), MgO (0.15 g), Polyvinylpyrrolidone dispersant (PVP), Sigma-Aldrich) (0.05 g) in a solvent (N-Methyl-2-pyrrolidone, Sigma-Aldrich)(6.75 g). The LLZO slurry was placed in a Teflon bottle (30 mL in capacity, 0261716, Fisher Scientific) with 45 g $ZrO_2$ balls (2 mm in diameter) and ball milled overnight.

A binder (Polyethersulfone, VERADEL 3000P, Solvay Specialty Polymers) (0.483 g) was added to the slurry and the mixture was ball milled for an additional 2 hours. A wetting agent, DYNOL604 (0.133 g), was then added and the final mixture was ball milled for an additional 30 minutes. The ball milled LLZO slurry was transferred to another bottle without milling balls and a centrifugal mixer was used to remove bubbles for 1 minute and placed in a vacuum chamber to degas further.

A polymer (PMMA) slurry was prepared using the same formulation as the LLZO slurry except the 5 g LLZO, 0.3 g $Li_2CO_3$, and 0.15 g MgO were replaced with 1.217 g PMMA (Particle size: 2.9 µm, Soken, MX-300).

For solvent exchange, $Li_2CO_3$ saturated water was prepared by dissolving 13 g $Li_2CO_3$ in 1 L deionized water with magnetic stirring. 500 mL of $Li_2CO_3$ saturated water was poured into a stainless-steel tray surrounded by ice and the bath water temperature was cooled down to 0° C.

The LLZO slurry was tape cast on an un-coated PET substrate with a speed of 20. The thickness was 320 µm. Then the PMMA slurry was tape cast on top of the LLZO tape with the applicator height of 400 µm. The substrate is mounted to an $Al_2O_3$ plate with a sticky tape to prevent warping of the PET substrate during phase inversion. The plates and tapes were transferred into the cold water bath to sit for 60 minutes. After the bath, the cast tape was removed and allowed to dry naturally overnight.

The dry tapes were cut to the desired size and disposed between two $Al_2O_3$ plates and placed in a box furnace at 650° C. for 2 hours to remove the binder. The heating rate was 1° C./min and the cooling rate was 5° C./min.

The debinded tape was then placed between two graphite sheets and two $Al_2O_3$ plates (0.05" thick) placed on the outside. The tape was sintered at 1150° C. for 2 hours in an Ar atmosphere, with heating and cooling rates of about 5° C./min.

Example 3

To further demonstrate the materials and methods, dense/porous tapes were prepared with high shear compaction and evaluated. Samples were prepared with lab-scale procedures that mimic the full-scale process. A LLZO slurry was prepared with LLZO (5 g), $Li_2CO_3$ (0.3 g), MgO (0.1 g), 12.3 wt. % commercial binder, and polymethyl methacrylate (PMMA, Sunjin Chemical Co. Ltd, South Korea) pore former (40, 60, 80 vol %). Water was used as the solvent. The size of PMMA was approximately 60 µm and the thickness of the tape was about 200 µm. The HSC is capable of preparing tapes with high quality and excellent dimensional tolerance, without separation of the LLZO, pore former, and binder phases. It is believed that the HSC process has not been used previously to fabricate battery components. The HSC tapes were prepared by Ragan Technologies with a full-scale continuous process.

The fabricated HSC tapes were laminated with dense tapes at 100° C. and 100 MPa for 15 minutes to make the bi-layer structures. Another laminate of a porous/dense/porous tri-layer structure was also formed by lamination at 100° C. with a pressure 100 MPa (120 MPa for the HSC tape with 80 vol % PMMA). The multi-layer structures were sandwiched between two Si-coated PET films during lamination. The tapes were heated without pressure for about 10 minutes and then pressure was applied for approximately 20 minutes and then immediately removed.

The HSC tape with 40 vol. % PMMA was prepared and sintered at 1125° C. for 5 hours and a pure cubic phase was obtained except for a tiny peak at 27.8°, similar to that observed with the PI tape. To remove the binder, the laminate was placed between two $Al_2O_3$ plates and placed in a box furnace at 700° C. for 1 hour. The heating rate was 1° C./min and the cooling rate was 5° C./min.

Other tapes were sintered after binder removal by placing the tapes between two graphite sheets that were inserted between two $Al_2O_3$ plates. The tapes were sintered at about 1135° C. to 1150° C. for 2 hours in an Argon atmosphere with heating and cooling rates of 5° C./min.

The ICP-OES data tabulated in Table 1 show the stoichiometry of Li:Al:La:Zr is 6.97:0.26:3:2.23. Less Li that was observed in the HSC tape than seen in the PI tape could be due to absence of extra $Li_2CO_3$ used to saturate the water solvent during the tape preparation. The lattice parameter was calculated to be 12.962 Å, which is similar to the dense tapes.

The sintered tapes were approximately 150 μm thick and contained round pores with diameters ranging from 30 μm to 60 μm. In contrast to the elongate pore shape in the PI tape, the HSC pores were nearly spherical and only slightly elongated in the x-y plane, presumably due to deformation during compaction or anisotropic shrinkage during sintering. The average porosity of the sintered tape was 39.5%, close to the volume loading of PMMA (40 vol. %) in the green tape. The porosity was uniformly distributed along the Z direction and the average pore area was also distributed uniformly.

The porosity of the sintered HSC tapes could be adjusted by changing the PMMA loading in the green tapes. Microtomography analysis indicated that the porosity of the three tapes prepared with 40, 60, and 80 vol. % PMMA is 39.5, 58.4, and 75.4%, respectively. The microstructure of bi-layers assembled by laminating tape-cast electrolytes to the HSC layers demonstrated excellent adhesion between the layers and good densification of the scaffold and the approximately 25 μm thick electrolyte layer. In contrast to the PI structure, there were large open pores on the HSC top surface, which is beneficial for cathode filling. The grain size was around 5 μm to 10 μm, similar to that observed in the PI tape.

Example 4

Figure 5:
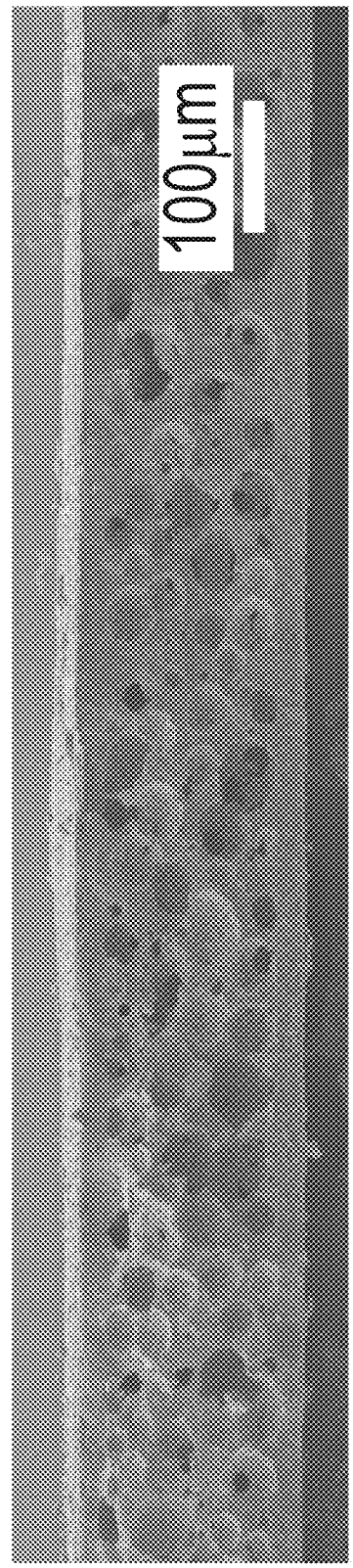
FIG. 5 is a cross-sectional SEM image of a high shear compaction tape (60 vol % PMMA) with a dense/porous/dense tri-layer structure.

Ionic conductivity of the LLZO scaffolds in the phase inversion (PI) and high-shear-compaction (HSC) tapes was measured. Impedance spectroscopy of the sintered PI porous tape (0° C.) and HSC-40, 60, and 80 dense/porous/dense tri-layer tapes at room temperature, converted to Ohm cm, was also conducted. A cross-sectional SEM image of a high shear compaction tape (60 vol % PMMA) with the dense/porous/dense tri-layer structure is shown in FIG. 5.

Since the sintered PI structure (solvent exchanged at 0° C.) is dense on the bottom and has very small pore size (3-7 μm) on the top, silver paste was directly cast on both sides as the electrical contact for EIS analysis. HSC tapes have larger pores (30 μm to 60 μm) on both sides and silver paste could fill the pores when the paste was wet. Therefore, a thin (~20 μm) and dense LLZO layer was laminated on both sides of the porous tapes to have dense/porous/dense tri-layer structure after sintering.

The effective ionic conductivity based on total geometric area of the PI tape with 37% porosity is $6.4 \times 10^{-5}$ S/cm, and $1.0 \times 10^{-4}$, $6.2 \times 10^{-5}$, and $1.2 \times 10^{-5}$ S/cm for the HSC tapes with 40, 60, and 80 vol % PMMA respectively. These values were not normalized by the porosity. For comparison, thin dense electrolyte layers prepared with the same powder provide approximately $2 \times 10^{-4}$ S/cm. As expected, the porosity decreases the effective conductivity.

High interfacial resistance between the solid electrolyte and the cathode lowers the performance of SSBs. Infiltrating cathode material into a LLZO scaffold is a useful approach to lower the electrolyte/cathode resistance. To demonstrate the utility of the scaffolds as an electrode support, a typical cathode material, lithium nickel manganese cobalt oxide (NMC) (MTI corporation, USA), was dispersed in a N-Methyl-2-pyrrolidone (NMP, Sigma Aldrich, USA) solvent and ball milled for 48 hours to obtain submicron-scale particles. The NMC material was ball-milled to reduce the particle size sufficiently to allow penetration into the pores of the scaffolds. The NMC suspension was drop cast on bi-layer structures and infiltrated under vacuum. The tapes were dried under vacuum at 60° C. for 5 hours to evaporate the NMP solvent.

The cathode material, NMC, was clearly observed inside the bi-layer structures in both the PI and HSC porous layers. EDS mapping showed the elemental distribution of Zr, Ni, Mn, and Co for the HSC tape, demonstrating the successful infiltration of the NMC into the scaffold. A layer of NMC with the thickness of several hundred nanometers covers the LLZO scaffold with good contact. Even locations at the buried interface of the scaffold and electrolyte were covered by NMC, confirming the connectivity of the pores. Multiple cycles of infiltration may be needed to load more NMC cathode material, as the pores were not filled completely after the one-cycle infiltration demonstrated here.

The XRD patterns of the PI and HSC tapes with NMC infiltration match the cubic LLZO and NMC phases, indicating no reaction between LLZO and NMC after drying at 60° C. In addition, no reaction between LLZO and the solvent NMP was detected. Bi-layer structures prepared with 40 and 60 vol. % PMMA were also successfully infiltrated with NMC.

From the description herein, it will be appreciated that the present disclosure encompasses multiple implementations which include, but are not limited to, the following:

A method of forming a porous tape structure, the method comprising: (a) forming a slurry of LLZO powder, a binder and a solvent; (b) tape casting the slurry on a base to form a LLZO tape; (c) immersing the LLZO tape in water to induce solvent/water exchange; and (d) removing the LLZO tape from the water and drying the LLZO tape; (e) wherein a LLZO tape with elongate pores with a length aligned perpendicularly to a top surface of the LLZO tape is produced.

The method of any preceding or following implementation, wherein the slurry further comprises one or more selected from the group of $Li_2CO_3$, MgO, a dispersant and a wetting agent.

The method of any preceding or following implementation, wherein the water for solvent/water exchange further comprises: a lithium salt selected from the group consisting of $Li_2CO_3$, LiCl, LiOH, $LiNO_3$, and $Li_2SO_4$; wherein lithium loss during solvent exchange is inhibited.

The method of any preceding or following implementation, wherein the base comprises a dense LLZO tape forming a LLZO tape with a dense/porous bilayer.

The method of any preceding or following implementation, wherein a second porous layer is tape cast on the dense LLZO base forming a LLZO tape with a porous/dense/porous tri-layer.

The method of any preceding or following implementation, wherein the water has a temperature between about 0° C. and about 50° C., wherein porosity of the LLZO tape increases with decreasing temperatures.

The method of any preceding or following implementation, further comprising removing a top surface of the LLZO tape to increase size of pore openings.

The method of any preceding or following implementation, further comprising removing binder from the dry LLZO tape; and sintering the LLZO tape after binder removal.

The method of any preceding or following implementation, further comprising infiltrating a powdered electrode material into the porosity of the sintered LLZO tape.

A method of forming a porous tape structure, the method comprising: (a) forming a slurry of LLZO powder, a binder and a solvent; (b) tape casting the slurry on a substrate to form a LLZO tape; (c) applying a sacrificial layer on the LLZO tape to produce a bi-layered LLZO tape; (d) immersing the bi-layered LLZO tape in water to induce solvent/water exchange; (e) removing the bi-layered LLZO tape from the water and drying the bi-layered LLZO tape; and (f) heating the bi-layered LLZO tape to remove the sacrificial layer and sinter the LLZO tape to produce a sintered LLZO tape; (g) wherein a sintered LLZO tape with elongate pores with a length aligned perpendicularly to a top surface of the sintered LLZO tape is produced.

The method of any preceding or following implementation, wherein the sacrificial layer is a material selected from the group of materials consisting of poly(methyl methacrylate) (PMMA), carbon, graphite, camphor, naphthalene and a polymer.

The method of any preceding or following implementation, wherein the slurry further comprises one or more selected from the group of $Li_2CO_3$, MgO, a dispersant and a wetting agent.

The method of any preceding or following implementation, wherein the water for solvent/water exchange further comprises: a lithium salt selected from the group consisting of $Li_2CO_3$, LiCl, LiOH, $LiNO_3$, and $Li_2SO_4$; wherein lithium loss during solvent exchange is inhibited.

The method of any preceding or following implementation, further comprising: removing binder from the dry bi-layered LLZO tape; sintering the bi-layered LLZO tape after binder removal; and infiltrating the sintered LLZO tape with lithium nickel manganese cobalt oxide (NMC).

A method of forming a porous tape structure, the method comprising: (a) forming a LLZO mixture tape from a mixture of LLZO powder and a pore former by high shear compaction; (b) tape casting a LLZO slurry of LLZO powder and $Li_2CO_3$ in a solvent on a substrate to form a dense LLZO tape; and (c) laminating the dense LLZO tape to the LLZO mixture tape.

The method of any preceding or following implementation, further comprising forming a second LLZO mixture tape from LLZO and a pore former by high shear compaction; and laminating the second LLZO mixture tape to the dense LLZO tape to produce a trilayer laminate of LLZO mixture tape/dense LLZO tape/LLZO mixture tape.

The method of any preceding or following implementation, the dense LLZO tape is formed from a slurry of a mixture of LLZO powder, $Li_2CO_3$ and MgO.

The method of any preceding or following implementation, wherein the pore former comprises polymethyl methacrylate (PMMA) and wherein the pore former comprises a volume % of the mixture tape in the range of 35 volume % and 85 volume % of the mixture.

The method of any preceding or following implementation, further comprising sintering the dense LLZO tape/LLZO mixture tape laminate; and infiltrating the of LLZO mixture tape laminate with lithium nickel manganese cobalt oxide (NMC).

The method of any preceding or following implementation, further comprising sintering the LLZO mixture tape/dense LLZO tape/LLZO mixture tape laminate to produce a sintered LLZO laminate; and infiltrating the sintered LLZO laminate with lithium nickel manganese cobalt oxide (NMC).

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Element concentrations from ICP-OES and their normalized (by La-content) molar ratios of green powder, PI tape and HSC tape.

| | Green | | PI | | HSC | |
|---|---|---|---|---|---|---|
| Element | Concentration (ppm) | Molar Ratio | Concentration (ppm) | Molar Ratio | Concentration (ppm) | Molar Ratio |
| Li | 27.2977 ± 0.1181 | 6.52 | 31.0202 ± 0.167263 | 7.08 | 34.3786 ± 0.105287 | 6.97 |
| Al | 3.45146 ± 0.039455 | 0.21 | 4.11095 ± 0.032553 | 0.24 | 4.97093 ± 0.038617 | 0.26 |
| La | 251.201 ± 1.10687 | 3 | 263.029 ± 4.4284 | 3 | 296.13 ± 3.18332 | 3 |
| Zr | 120.754 ± 0.383983 | 2.20 | 125.195 ± 1.61013 | 2.17 | 144.551 ± 3.36229 | 2.23 |
| Mg | 0 | 0 | 6.25987 ± 0.041988 | 0.41 | 6.98639 ± 0.074974 | 0.40 |

What is claimed is:

1. A method of forming a porous tape structure, the method comprising:
   (a) forming a slurry of LLZO powder, a binder and a solvent;
   (b) tape casting the slurry on a substrate to form a LLZO tape;
   (c) applying a sacrificial layer on the LLZO tape to produce a bi-layered LLZO tape;
   (d) immersing the bi-layered LLZO tape in water to induce solvent/water exchange;

(e) removing the bi-layered LLZO tape from the water and drying the bi-layered LLZO tape; and
(f) heating the bi-layered LLZO tape to remove the sacrificial layer and sinter the LLZO tape to produce a sintered LLZO tape;
(g) wherein a sintered LLZO tape with elongate pores with a length aligned perpendicularly to a top surface of the sintered LLZO tape is produced;
(h) wherein the water for solvent/water exchange further comprises a lithium salt selected from the group consisting of $Li_2CO_3$, LiCl, LiOH, $LiNO_3$ and $Li_2SO_4$; and
(i) wherein lithium loss from solid materials during solvent exchange is inhibited.

2. The method of claim 1, wherein the sacrificial layer is a material selected from the group of materials consisting of poly(methyl methacrylate) (PMMA), carbon, graphite, camphor, naphthalene and a polymer.

3. The method of claim 1, wherein the slurry further comprises one or more selected from the group of $Li_2CO_3$, MgO, a dispersant and a wetting agent.

4. The method of claim 1, further comprising:
removing binder from the dry bi-layered LLZO tape;
sintering the bi-layered LLZO tape after binder removal; and
infiltrating the sintered LLZO tape with lithium nickel manganese cobalt oxide (NMC).

* * * * *